(12) United States Patent
Qiao et al.

(10) Patent No.: US 10,303,509 B2
(45) Date of Patent: May 28, 2019

(54) DISTRIBUTED TASK SYSTEM BASED ON INTERNET OF THINGS AND SERVICE PROCESSING METHOD FOR DISTRIBUTED TASKS BASED ON THE SAME

(71) Applicant: SENGLED OPTOELECTRONICS CO., LTD., Tongxiang (CN)

(72) Inventors: Haiming Qiao, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 12 days.

(21) Appl. No.: 15/545,697

(22) PCT Filed: Dec. 9, 2016

(86) PCT No.: PCT/CN2016/109327
§ 371 (c)(1),
(2) Date: Jul. 23, 2017

(87) PCT Pub. No.: WO2017/114141
PCT Pub. Date: Jul. 6, 2017

(65) Prior Publication Data
US 2018/0004568 A1    Jan. 4, 2018

(30) Foreign Application Priority Data

Dec. 30, 2015    (CN) .......................... 2015 1 1025583

(51) Int. Cl.
*G06F 9/46* (2006.01)
*G06F 9/48* (2006.01)
(Continued)

(52) U.S. Cl.
CPC .......... *G06F 9/4818* (2013.01); *G06F 9/4881* (2013.01); *G06F 9/5038* (2013.01); *G06F 9/547* (2013.01)

(58) Field of Classification Search
None
See application file for complete search history.

(56) References Cited

U.S. PATENT DOCUMENTS

2006/0048161 A1*  3/2006  de Rose ............... G06F 9/5072
                                                    718/105
2015/0163289 A1*  6/2015  Paul ....................... H04L 67/02
                                                    709/201
(Continued)

FOREIGN PATENT DOCUMENTS

CN    104462370 A    3/2015
CN    104636199 A    5/2015
(Continued)

*Primary Examiner* — Wissam Rashid
(74) *Attorney, Agent, or Firm* — Anova Law Group, PLLC (57) ABSTRACT

A distributed task system based on internet of things and a related service processing method are provided. The system can include a trigger for receiving data sent by a smart device or a user in the internet of things, a task scheduling module and a plurality of processing units. The task scheduling module can instantiate a service processing flow according to the data received by the trigger, and can sequentially schedule and start multiple processing units according to the service processing flow. Each processing units can execute a certain stage task of the service processing flow, and send an execution result of the certain stage of the service processing flow back to the task scheduling module. And the task scheduling module can notify the smart device or the user of a final execution result of one processing unit that executes a final stage task of the service processing flow.

19 Claims, 2 Drawing Sheets

(51) Int. Cl.
*G06F 9/50* (2006.01)
*G06F 9/54* (2006.01)

(56) References Cited

U.S. PATENT DOCUMENTS

2015/0186228 A1* 7/2015 Kumar ................ G06F 11/2028
714/4.12
2017/0060633 A1* 3/2017 Suarez Gracia .......... G06F 9/48

FOREIGN PATENT DOCUMENTS

| CN | 104750549 A | 7/2015 |
| CN | 105677462 A | 6/2016 |
| EP | 2882140 A1 | 6/2015 |

\* cited by examiner

DISTRIBUTED TASK SYSTEM BASED ON INTERNET OF THINGS AND SERVICE PROCESSING METHOD FOR DISTRIBUTED TASKS BASED ON THE SAME

CROSS-REFERENCES TO RELATED APPLICATIONS

This application is a national phase entry under 35 U.S.C. § 371 of International Application No. PCT/CN2016/109327, filed on Dec. 9, 2016, which claims priority of Chinese Patent Application No. 201511025583.4, filed on Dec. 30, 2015, The above enumerated patent applications are incorporated by reference herein in their entirety.

TECHNICAL FIELD

The present disclosure generally relates to the field of internet of things and, more particularly, relates to a distributed task system and a service processing method based on internet of things.

BACKGROUND

As smart devices have been widely used in all aspects of people's day-to-day life, internet of things, which promotes connections between smart devices and users, is currently rising rapidly. The software services in the internet of things need to face a complicated connectivity and task processing of a large number of users and a large number of different types of smart devices.

Current software services may include use of a single smart device for a single service. Every time when a new smart device is connected or is used to process a task, a related function corresponding to the connection or task processing of the new smart device has to be developed and redeployed.

Another software service may use a load balancing method to relocate a request from a smart device to different processing units to realize a load balance among the different processing units. In this case, the service function needs are closely coupled with the software services. Thus, a connectivity or task processing of a new smart device may require a modification of the software.

Further, the current software services have a common, slow response problem.

Accordingly, it is desirable to provide a distributed task system based on internet of things and a service processing method for distributed tasks based on internet of things.

BRIEF SUMMARY

In accordance with embodiments of the present disclosure, a distributed task system based on internet of things and a service processing method for distributed tasks based on internet of things are provided.

An aspect of the present disclosure provides a distributed task system based on internet of things. The system can include: a trigger configured for receiving data sent by at least a smart device and a user in the internet of things; a task scheduling module electrically connected to the trigger; and a plurality of processing units, wherein: the task scheduling module is configured for: instantiating a service processing flow according to the data received by the trigger, and sequentially scheduling and starting one or more of the plurality of processing units according to the service processing flow; each of the one or more processing units is configured for: executing a certain stage task of the service processing flow, and sending an execution result of the certain stage of the service processing flow back to the task scheduling module; and the task scheduling module is further configured for notifying the smart device or the user of a final execution result of one processing unit that executes a final stage task of the service processing flow.

In some embodiments, the task scheduling module is further configured for monitoring an execution status of each of the one or more processing units.

In some embodiments, the execution status of a processing unit includes an execution success state.

In some embodiments, the task scheduling module is further configured for: when the execution state of an $n^{th}$ processing unit is an execution success state, scheduling and staring an $(n+1)^{th}$ processing unit according to an execution result transmitted from the $n^{th}$ processing unit, wherein number n is a positive integer between 1 and (N−1), number N is a total number of the one or more of the plurality of processing units that execute the service processing flow.

In some embodiments, the execution status of a processing unit includes an execution time-out state and an execution failure state.

In some embodiments, the task scheduling module is further configured for: in response to a determination that n is equal to 1 and the execution status of the $n^{th}$ processing unit is an execution failure state or an execution timeout state, re-scheduling the $n^{th}$ processing unit according to the data received by the trigger; and in response to a determination that n is larger than 1 and the execution status of the $n^{th}$ processing unit is an execution failure state or an execution timeout state, re-scheduling the $n^{th}$ processing unit according to the execution result transmitted from the $(n-1)^{th}$ processing unit.

In some embodiments, the task scheduling module is further configured for: in response to a determination that the execution status of the $n^{th}$ processing unit is an execution failure state or an execution timeout state, cancelling the corresponding stage of the service processing flow executed by the $n^{th}$ processing unit.

In some embodiments, the task scheduling module is further configured for: recording a failure value that indicates a number of times when the execution status of a processing unit is an execution failure state; and when the failure value is larger than a preset threshold value, scheduling and starting another processing unit to execute a corresponding failed stage task of the service processing flow.

In some embodiments, the task scheduling module is further configured for: when a single processing unit is used to execute different service processing flows, determining priorities of the different service processing flows, and scheduling the single processing unit to sequentially execute the service processing flows based on the priorities.

In some embodiments, the distributed task system further includes a storage module electrically connected to the task scheduling module, wherein the storage module is configured for storing identifications of the one or more of the plurality of processing units that execute different stage tasks of the service processing flow in a form of a queue; and wherein the task scheduling module is further configured for sequentially scheduling the one or more of the plurality of processing units to execute corresponding stages of the service processing flow based on the identifications of the one or more of the plurality of processing units stored in the queue.

Another aspect of the disclosed subject matter provides a service processing method for distributed tasks based on internet of things, comprising: receiving data sent by at least a smart device and a user in the internet of things; instantiating a service processing flow according to the data; according to the service processing flow, sequentially scheduling and starting one or more of a plurality of processing units to execute different stage tasks of the service processing flow; and notifying the smart device or the user of a final execution result of one processing unit that executes a final stage task of the service processing flow.

In some embodiments, the method further includes monitoring an execution status of each of the one or more of the plurality of processing units.

In some embodiments, the execution status of a processing unit includes an execution success state.

In some embodiments, the method further includes: when the execution state of an $n^{th}$ processing unit is an execution success state, scheduling and staring an $(n+1)^{th}$ processing unit according to an execution result transmitted from the $n^{th}$ processing unit, wherein number n is a positive integer between 1 and (N−1), number N is a total number of the one or more of the plurality of processing units that execute the service processing flow.

In some embodiments, the execution status of a processing unit includes an execution time-out state and an execution failure state.

In some embodiments, the method further includes: in response to a determination that n is equal to 1 and the execution status of the $n^{th}$ processing unit is an execution failure state or an execution timeout state, re-scheduling the $n^{th}$ processing unit according to the data received by the trigger; and in response to a determination that n is larger than 1 and the execution status of the $n^{th}$ processing unit is an execution failure state or an execution timeout state, re-scheduling the $n^{th}$ processing unit according to the execution result transmitted from the $(n-1)^{th}$ processing unit.

In some embodiments, the method further includes: in response to a determination that the execution status of the $n^{th}$ processing unit is an execution failure state or an execution timeout state, cancelling the corresponding stage of the service processing flow executed by the $n^{th}$ processing unit.

In some embodiments, the method further includes recording a failure value that indicates a number of times when the execution status of a processing unit is an execution failure state; and when the failure value is larger than a preset threshold value, scheduling and starting another processing unit to execute a corresponding failed stage task of the service processing flow.

In some embodiments, the method further includes: when a single processing unit is used to execute different service processing flows, determining priorities of the different service processing flows, and scheduling the single processing unit to sequentially execute the service processing flows based on the priorities.

In some embodiments, the method further includes: storing identifications of the one or more of the plurality of processing units that execute different stage tasks of the service processing flow in a form of a queue; and sequentially scheduling the one or more of the plurality of processing units to execute corresponding stages of the service processing flow based on the identifications of the one or more of the plurality of processing units stored in the queue.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments, the present disclosure provides a distributed task system based on internet of things and a service processing method for distributed tasks based on internet of things.

The term of internet of things used herein is referred to an internetworking of physical objects. Clearly, the core and foundation of the internet of things is still the Internet. The internet of things is an expanded and extended network based on the Internet. The user terminals of the internet of things can be expanded and extended to any objects and items for information exchange and communication.

The smart devices in the internet of things can have several notable features.

For example, the smart devices in the internet of things can have a variety of different types, such as smart lighting devices, smart home appliances, smart life health devices, smart furniture, smart industrial devices, smart security devices, etc.

As another example, the smart devices in the internet of things can have a huge amount. Data shows that the number of objects in the internet of things can be hundreds of millions of scale, which is hundreds of times or even thousands of times the size of the Internet.

As yet another example, the smart devices in the internet of things can be in an online status at any time. Various smart devices can be connected to the Internet and be kept online for a certain period of time. As such, the users may access their smart devices from anywhere at any time.

Figure 1:
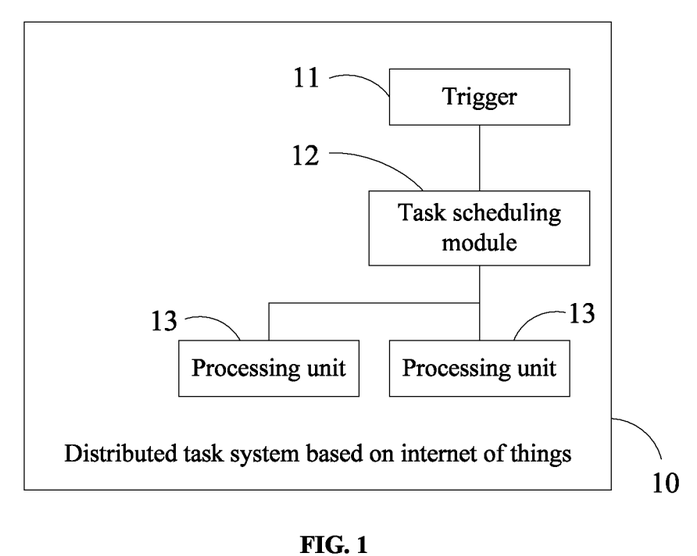
FIG. 1 is a schematic structural diagram of an exemplary distributed task system based on internet of things in accordance with various embodiments of the present disclosure.

Referring to FIG. 1, a schematic structural diagram of an exemplary distributed task system based on internet of things is shown in accordance with various embodiments of the present disclosure.

As illustrated, the distributed tasks system 10 based on internet of things can include a trigger 11, a task scheduling module 12, and multiple processing units 13. The trigger 11 can be used for receiving data sent by one or more smart devices in the internet of things, or data inputted by one or more users of the internet of things.

The task scheduling module 12 is electrically connected to the trigger 11. The task scheduling module 12 can be used for instantiating a service processing flow according to the data sent by the smart devices or the data inputted by the users. The task scheduling module 12 can be further used for sequentially scheduling and starting a set of the multiple processing units 13 according to the service processing flow.

Each of the multiple processing units 13 can be used for executing at a certain stage of the service processing flow, and for sending execution results back to the task scheduling module 12.

The task scheduling module 12 is further used for notifying the one or more smart devices or the one or more users of an execution result of one processing unit that executes at a final stage of the service processing flow.

Specifically, after the trigger 11 receives the data sent by the one or more smart devices in the internet of things, or receives the data inputted by the one or more users of the internet of things, it can be determined that whether the received data meets conditions of a predefined service processing flow.

When the received data meets the conditions of a predefined service processing flow, the trigger 11 can trigger the task scheduling module 12 to instantiate the service processing flow.

Based on the received data, the task scheduling module 12 can schedule and start a first processing unit. After running of a first stage (or first stage task) of the service processing flow, the first processing unit can return an execution result to the task scheduling module 12. Based on the execution result of the first processing unit, the task scheduling module 12 can select, schedule, and start a second processing unit. Then a second stage of the service processing flow can be executed. And the process can go on, and finally complete the entire service processing flow.

A logical structure of the distributed task system 10 based on internet of things can be described from an aspect of data processing in the following.

Figure 2:
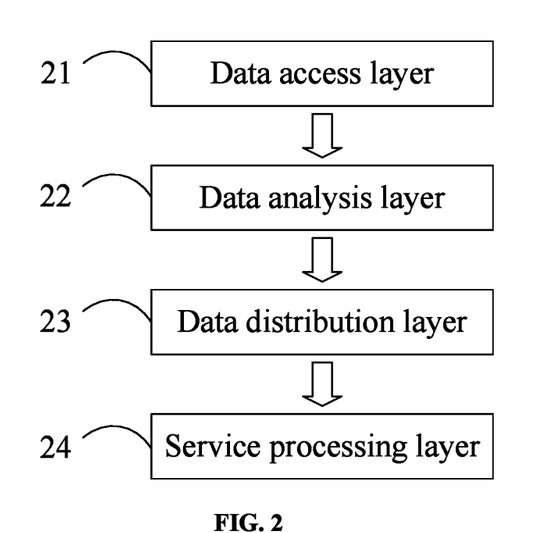
FIG. 2 is a schematic logical structural diagram of data processing of a distributed task system based on internet of things in accordance with various embodiments of the present disclosure.

Referring to FIG. 2, a schematic logical structural diagram of data processing of the distributed task system based on internet of things is shown in accordance with some embodiments of the present disclosure. As illustrated, the logical structure of the system can include a data access layer 21, a data analysis layer 22, a data distribution layer 23, and a service processing layer 24.

Since the internet of things can include a large number of smart devices and users, the distributed task system 10 based on internet of things needs to face a large number of smart devices and users. Therefore, the data access layer 21 can include a large number of parallel service operations to process the data transmitted from the smart devices or inputted by the users. The data transmitted from a smart device can include data generated by a user clicking on a button of the smart device, and include data entered by a user by an input component of the smart device, such as, data inputted by the user on a touch screen of a smartphone.

The data analysis layer 22 can instantiate a service processing flow through corresponding logical processing, e.g., merging, the data transmitted from the smart devices, or the data inputted by the users.

The data distribution layer 23 can forwards the service processing flow obtained from the data analysis layer 22 to corresponding processing units through certain logics. In this process, the data distribution layer 23 can consider a carrying capacity of the processing units, and all possibly generated orders.

The service processing layer 24 can implement the service processing flow based on the predefined corresponding service processing flow, and can store/forward the data, or re-enters the data processing process. In this case, data flow loop must be considered.

In the structure illustrated in FIG. 1, the trigger 11 is located in the data access layer 21, the task scheduling module 12 is located in the data analysis layer 22 and the data distribution layer 23, and the processing unit 13 is located in the service processing layer 24.

In some embodiments, by using a service pre-definition, a series of processing units can be combined as an execution subject that process a task at a certain stage of the service processing flow. And the service processing flow can be initiated through the trigger 11. In FIG. 1, an expletory number of the processing units 13 illustrated is two. However, any suitable positive integer number of processing units 13 can be used, and may not be limited herein according to various embodiments of the present disclosure.

It should be noted that, the processing units 13 may be embodied as processors or servers. The numbers of the trigger 11 and the processing units 13 illustrated in FIG. 1 are only exemplary, and should not be limited herein according to various embodiments of the present disclosure.

Compared to the existing services, the disclosed distributed task system based on internet of things can instantiate a service processing flow according to data sent by smart devices or inputted by the users. According to the service processing flow, the disclosed system can sequentially schedule and start multiple processing units to execute different tasks at certain stages of the service processing flow. A final execution result from a processing unit that executes a final stage of the service processing flow can be notified to one or more smart devices or users.

Through such a distributed execution of the service processing flow, it is possible to flexibly add new service processes. As such, without performing complex development and testing work, new smart device connections or new service processes can be supported. Therefore, a rapid response of new smart device connectivity or service processing can be achieved.

On the basis of the above embodiments, in some implementations, the task scheduling module 12 is further used for monitoring an execution status of each processing unit in the internet of things.

The execution status of a processing unit may include an execution success state. When the execution state of the $n^{th}$ processing unit is an execution success state, the $(n+1)^{th}$ processing unit is scheduled and started by the task scheduling module 12 according to the execution result transmitted from the $n^{th}$ processing unit. Number n is a positive integer between 1 and N−1, and number N is a total number of all processing units that execute tasks in the service processing flow.

For example, assuming a value of N is 5. When the execution state of the first processing unit is monitored to be an execution success state, the task scheduling module 12 can schedule and start the second processing unit based on the execution result transmitted from the first processing unit. And the process can go on until the task scheduling module 12 obtains a final execution result transmitted from the fifth processing unit.

In some other implementations, the execution status of a processing unit may also include an execution time-out state and an execution failure state.

The task scheduling module 12 is further used for, in response to a determination that n is equal to 1 and the execution status of the $n^{th}$ processing unit is an execution failure state or an execution timeout state, re-scheduling the $n^{th}$ processing unit according to the data transmitted from the smart device or inputted by the user.

The task scheduling module 12 is further used for, in response to a determination that n is larger than 1 and the execution status of the $n^{th}$ processing unit is an execution failure state or an execution timeout state, re-scheduling the $n^{th}$ processing unit according to the execution result transmitted from the $(n-1)^{th}$ processing unit.

Optionally, the task scheduling module 12 is further used for, in response to a determination that the execution status of the $n^{th}$ processing unit is an execution failure state or an execution timeout state, cancelling the task executed by the $n^{th}$ processing unit.

In some embodiments, the task scheduling module 12 is further used for recording a failure value that indicates a number of times when the execution status of a processing unit is an execution failure state. When the failure value is larger than a preset threshold value, the task scheduling module 12 can schedule and start one or more processing units to execute the failed stage of the service processing flow. For example, a special processing unit may be provided in advance for only executing the failed stage of the service processing flow. However, the example is not limited in the present disclosure.

Through the above embodiments, the task scheduling module can monitor the execution status of the processing units. Since the execution status of the processing units can reflect a frequency of the service processing, the hot spots and performance bottleneck of the service can be acknowledged in real-time by monitoring the execution status of the processing units.

Further, when a single processing unit is used to execute different service processing flows, the task scheduling module 12 can be configured for, determining priorities of the different service processing flows, and scheduling the single processing unit to sequentially execute tasks in the service processing flows based on the priorities. In some embodiments, the priorities of the different service processing flows can be reflected by using weight values.

For example, a processing unit 13 is used to execute a first stage of a service processing flow 1 and a first stage of a service processing flow 2. It can be determined that a priority of the processing unit 13 to execute the first stage of the service processing flow 1 is weighted as 0.4, and a priority of the processing unit 13 to execute the first stage of the service processing flow 2 is weighted as 0.1. Therefore, the task scheduling module 12 can schedule the processing unit 13 to execute the first stage of the service processing flow 1 first.

Figure 3:
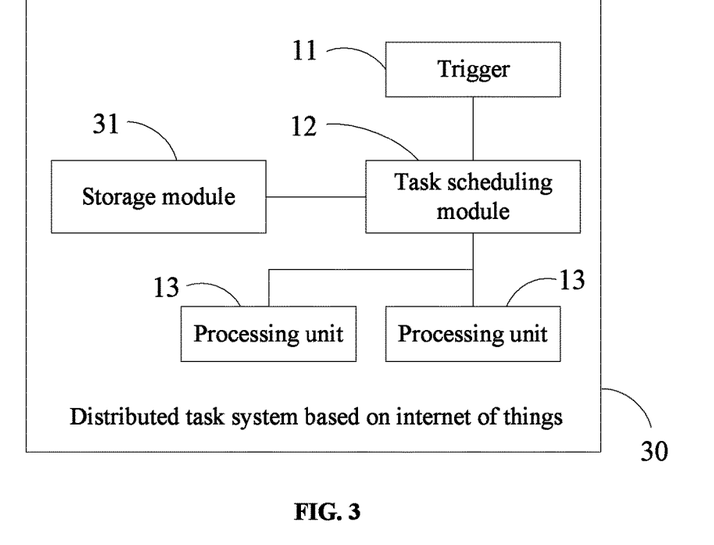
FIG. 3 is a schematic structural diagram of another exemplary distributed task system based on internet of things in accordance with various embodiments of the present disclosure.

Referring to FIG. 3, a schematic structural diagram of another exemplary distributed task system based on internet of things is illustrated in accordance with various embodiments of the present disclosure.

As illustrated, based on the structure of distributed task system 10 based on internet of things shown in FIG. 1, the system 30 for distributed tasks based on internet of things further includes a storage module 31.

The storage module 31 is electrically connected to the task scheduling module 12. The storage module 31 can be used for storing identifications of the multiple processing units that execute different stages (or stage tasks) of a service processing flow in a form of a queue. Accordingly, the task scheduling module 12 can be configured for sequentially scheduling the multiple processing units to execute corresponding stage tasks of the service processing flow based on the identifications of the multiple processing units stored in the queue.

The disclosed system including the storage module can store the identifications of the processing units that execute different stage tasks of a service processing flow in a queue, so as to ensure a scheduling order of the processing units and to guarantee a normal progress of the service processing flow.

In addition, according to the integration of resource management, the disclosed distributed task system based on internet of things can expand processing units in real time according to traffic load. As such, a service capability of the system can be enhanced, an automatic operation and maintenance can be realized, and a manual input can be reduced.

Figure 4:
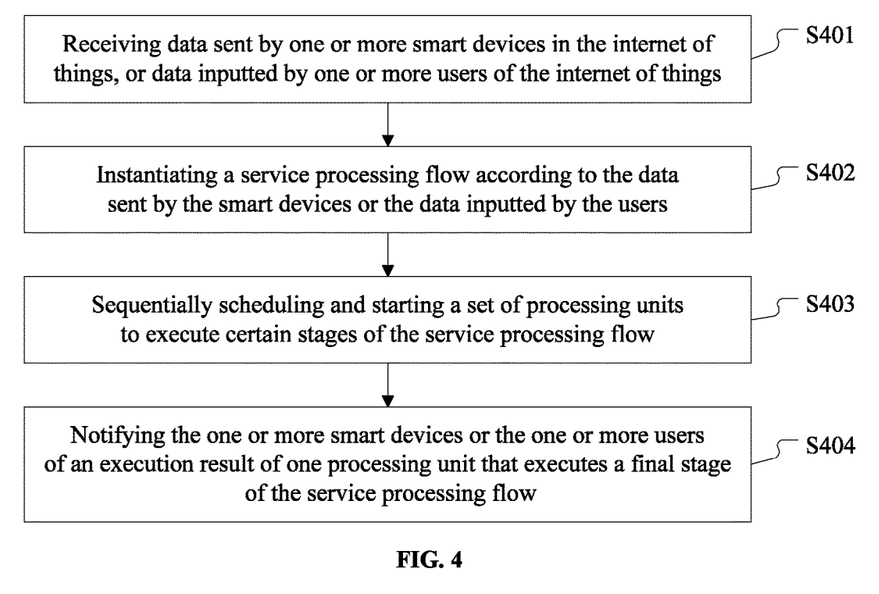
FIG. 4 is a schematic flowchart of an exemplary service processing method for distributed tasks based on internet of things in accordance with various embodiments of the present disclosure.

Referring to FIG. 4, a schematic flowchart of an exemplary service processing method for distributed tasks based on internet of things is shown in accordance with some embodiments of the present disclosure. As illustrated, the service processing method for distributed tasks based on internet of things can include the following steps.

At step 401, data sent by one or more smart devices in the internet of things, or data inputted by one or more users of the internet of things can be received.

At step 402, a service processing flow can be instantiated according to the data sent by the smart devices or the data inputted by the users.

At step 403, a set of processing units can be sequentially scheduled and started according to the service processing flow. Each processing unit can be used for executing a certain stage of the service processing flow.

At step 404, an execution result of one processing unit that executes a final stage of the service processing flow can be notified to the one or more smart devices or users.

The disclosed service processing method can be implemented by the disclosed distributed task system based on internet of things discussed above in connection with FIG. 1.

In some embodiments, the disclosed service processing method can further include monitoring an execution status of each processing unit in the internet of things. The execution status of a processing unit may include an execution success state.

When the execution state of the $n^{th}$ processing unit is an execution success state, the $(n+1)^{th}$ processing unit can be scheduled and started according to the execution result transmitted from the $n^{th}$ processing unit. Number n is a positive integer between 1 and (N−1), and number N is a total number of all processing units that execute tasks of the service processing flow.

In some embodiments, the execution status of a processing unit may further include an execution time-out state and an execution failure state.

The disclosed service processing method can further include, in response to a determination that n is equal to 1 and the execution status of the $n^{th}$ processing unit is an execution failure state or an execution timeout state, re-scheduling the n$^{th}$ processing unit according to the data transmitted from the smart device or inputted by the user.

The disclosed service processing method can further include, in response to a determination that n is larger than 1 and the execution status of the n$^{th}$ processing unit is an execution failure state or an execution timeout state, re-scheduling the n$^{th}$ processing unit according to the execution result transmitted from the (n−1)$^{th}$ processing unit.

Optionally, the disclosed service processing method can further include, in response to a determination that the execution status of the n$^{th}$ processing unit is an execution failure state or an execution timeout state, cancelling the task executed by the n$^{th}$ processing unit.

Further, the disclosed service processing method can include recording a failure value that indicates a number of times when the execution status of a processing unit is an execution failure state. When the failure value is larger than a preset threshold value, one or more processing units can be scheduled and started to execute the failed stage task of the service processing flow.

Further, when a single processing unit is used to execute different tasks according to the service processing flows, the disclosed service processing method can include determining priorities of the different service processing flows, and scheduling the single processing unit to sequentially execute the service processing flows based on the priorities.

Based on the above embodiments, the disclosed service processing method can further include storing identifications of the multiple processing units that execute different stages of a service processing flow in a form of a queue. Accordingly, the multiple processing units can be sequentially scheduled and started to execute corresponding stages of the service processing flow based on the identifications of the multiple processing units stored in the queue.

In some alternative embodiments, the task scheduling module 12 can generate a special task scheduling explorer for each instantiated service processing flow. In this case, for each instantiated service processing flow, the task scheduling module 12 only schedules and starts a first processing unit of the instantiated service processing flow, and transmits the special task scheduling explorer for the instantiated service processing flow to the first processing unit.

After running of a first stage task of the service processing flow, the first processing unit can use the special task scheduling explorer to determine a second processing unit to be scheduled and started based on an execution result of the first stage task of the service processing flow. Then the execution result of the first stage task of the service processing flow and the special task scheduling explorer of the instantiated service processing flow can be transmitted directly from the first processing unit to the second processing unit. And a second stage task of the service processing flow can be executed by the second processing unit. And the second processing unit can use the special task scheduling explorer to determine a third processing unit to be scheduled and started based on an execution result of the second stage task of the service processing flow. And the process can go on, and finally complete the entire service processing flow.

It should be understood by those of ordinary skill in the art that, all or part of the steps of implementing the above-described embodiments may be accomplished by program related hardware, such as a hardware processor. The program may be stored in a computer-readable storage medium. When the program is executed, the steps including the above-described embodiments can be executed. The storage medium can include various kinds of media, such as a ROM, a RAM, a magnetic disk, or an optical disk, on which program codes can be stored.

The descriptions of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a distributed task system based on internet of things and a service processing method for distributed tasks based on internet of things are provided.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A distributed task system based on internet of things, comprising:
   a trigger configured for receiving data sent by at least a smart device and a user in the internet of things;
   a task scheduling module electrically connected to the trigger; and
   a plurality of processing units, wherein:
      the task scheduling module is configured for: instantiating a service processing flow according to the data received by the trigger, and sequentially scheduling and starting one or more of the plurality of processing units according to the service processing flow;
      each of the one or more processing units is configured for: executing a certain stage task of the service processing flow, and sending an execution result of the certain stage of the service processing flow back to the task scheduling module; and
      the task scheduling module is further configured for: scheduling and starting an (n+1)$^{th}$ processing unit according to the execution result transmitted from an n$^{th}$ processing unit when an execution status of the n$^{th}$ processing unit is an execution success state, number n being a positive integer between 1 and (N−1), and number N being a total number of the one or more of the plurality of processing units that execute the service processing flow; and
      notifying the smart device or the user of a final execution result of one processing unit that executes a final stage task of the service processing flow.

2. The distributed task system of claim 1, wherein the task scheduling module is further configured for monitoring the execution status of each of the one or more processing units.

3. The distributed task system of claim 2, wherein the execution status of a processing unit includes an execution success state.

4. The distributed task system of claim 2, wherein the execution status of a processing unit includes an execution time-out state and an execution failure state.

5. The distributed task system of claim 4, wherein the task scheduling module is further configured for:

in response to a determination that n is equal to 1 and the execution status of the $n^{th}$ processing unit is an execution failure state or an execution timeout state, re-scheduling the $n^{th}$ processing unit according to the data received by the trigger; and in response to a determination that n is larger than 1 and the execution status of the $n^{th}$ processing unit is an execution failure state or an execution timeout state, re-scheduling the $n^{th}$ processing unit according to the execution result transmitted from the $(n-1)^{th}$ processing unit.

6. The distributed task system of claim 5, wherein the task scheduling module is further configured for: in response to a determination that the execution status of the $n^{th}$ processing unit is an execution failure state or an execution timeout state, cancelling the corresponding stage of the service processing flow executed by the $n^{th}$ processing unit.

7. The distributed task system of claim 5, wherein the task scheduling module is further configured for:
recording a failure value that indicates a number of times when the execution status of a processing unit is an execution failure state; and
when the failure value is larger than a preset threshold value, scheduling and starting another processing unit to execute a corresponding failed stage task of the service processing flow.

8. The distributed task system of claim 2, wherein the task scheduling module is further configured for:
when a single processing unit is used to execute different service processing flows, determining priorities of the different service processing flows, and scheduling the single processing unit to sequentially execute the service processing flows based on the priorities.

9. The distributed task system of claim 2, further comprising:
a storage module electrically connected to the task scheduling module,
wherein the storage module is configured for storing identifications of the one or more of the plurality of processing units that execute different stage tasks of the service processing flow in a form of a queue; and
wherein the task scheduling module is further configured for sequentially scheduling the one or more of the plurality of processing units to execute corresponding stapes of the service processing flow based on the identifications of the one or more of the plurality of processing units stored in the queue.

10. A service processing method for distributed tasks based on internet of things, comprising:
receiving data sent by at least a smart device and a user in the internet of things;
instantiating a service processing flow according to the data;
according to the service processing flow, sequentially scheduling and starting one or more of a plurality of processing units to execute different stage tasks of the service processing flow;
scheduling and starting an $(n+1)^{th}$ processing unit according to an execution result transmitted from an $n^{th}$ processing unit when an execution status of the $n^{th}$ processing unit is an execution success state, number n being a positive integer between 1 and (N−1), and number N being a total number of the one or more of the plurality of processing units that execute the service processing flow; and notifying the smart device or the user of a final execution result of one processing unit that executes a final stage task of the service processing flow.

11. The service processing method of claim 10, further comprising monitoring the execution status of each of the one or more of the plurality of processing units.

12. The service processing method of claim 11, wherein the execution status of a processing unit includes an execution success state.

13. The service processing method of claim 11, wherein the execution status of a processing unit includes an execution time-out state and an execution failure state.

14. The service processing method of claim 13, further comprising:
in response to a determination that n is equal to 1 and the execution status of the $n^{th}$ processing unit is an execution failure state or an execution timeout state, re-scheduling the $n^{th}$ processing unit according to the data received by the trigger; and
in response to a determination that n is larger than 1 and the execution status of the $n^{th}$ processing unit is an execution failure state or an execution timeout state, re-scheduling the $n^{th}$ processing unit according to the execution result transmitted from the $(n-1)^{th}$ processing unit.

15. The service processing method of claim 14, further comprising:
in response to a determination that the execution status of the $n^{th}$ processing unit is an execution failure state or an execution timeout state, cancelling the corresponding stage of the service processing flow executed by the $n^{th}$ processing unit.

16. The service processing method of claim 14, further comprising:
recording a failure value that indicates a number of times when the execution status of a processing unit is an execution failure state; and
when the failure value is larger than a preset threshold value, scheduling and starting another processing unit to execute a corresponding failed stage task of the service processing flow.

17. The service processing method of claim 11, further comprising:
when a single processing unit is used to execute different service processing flows, determining priorities of the different service processing flows, and scheduling the single processing unit to sequentially execute the service processing flows based on the priorities.

18. The service processing method of claim 11, further comprising:
storing identifications of the one or more of the plurality of processing units that execute different stage tasks of the service processing flow in a form of a queue; and
sequentially scheduling the one or more of the plurality of processing units to execute corresponding stages of the service processing flow based on the identifications of the one or more of the plurality of processing units stored in the queue.

19. A distributed task system based on internet of things, comprising:
a trigger configured for receiving data sent by at least a smart device and a user in the internet of things;
a task scheduling module electrically connected to the trigger; and
a plurality of processing units, wherein:
the task scheduling module is configured for: instantiating a service processing flow according to the data received by the trigger, and sequentially scheduling and starting one or more of the plurality of processing units according to the service processing flow;

each of the one or more processing units is configured for: executing a certain stage task of the service processing flow; and the task scheduling module is further configured for:

in response to a determination that n is equal to 1 and an execution status of an $n^{th}$ processing unit is an execution failure state or an execution timeout state, re-scheduling the $n^{th}$ processing unit according to the data received by the trigger;

in response to a determination that n is larger than 1 and the execution status of the $n^{th}$ processing unit is an execution failure state or an execution timeout state, re-scheduling the $n^{th}$ processing unit according to an execution result transmitted from an $(n-1)^{th}$ processing unit, number n being a positive integer; and notifying the smart device or the user of a final execution result of one processing unit that executes a final stage task of the service processing flow.

\* \* \* \* \*